United States Patent Office 2,928,807
Patented Mar. 15, 1960

2,928,807

CURING OF POLYEPOXIDES

William J. Belanger, Louisville, Ky., assignor to Devoe & Raynolds Co., Inc., a corporation of New York No Drawing. Application October 8, 1956
Serial No. 614,353

5 Claims. (Cl. 260—47)

This invention relates to a process for the curing of polyepoxides. In one of its aspects the invention relates to a new process for curing polyepoxides with acid anhydrides as curing agents, through the use of special accelerators for the curing agents.

Organic polybasic acid anhydrides are employed quite widely in the curing of epoxide resins. These anhydride curing agents give good physical, electrical, and chemical properties and particularly good heat distortion temperatures. They are characterized by low exothermic values. This means that polyepoxide-anhydride compositions must be cured for long periods of time, and, there is a risk of vaporization and loss of curing agent. As a consequence, polybasic acid anhydrides are not used in compositions which must be cured rapidly. Further, because of their longer curing periods, anhydrides are not as widely used as amines in the curing of epoxide resins.

In accordance with an aspect of this invention, at a given temperature, faster curing times are produced using organic polybasic acid anhydrides as curing agents with selected polyepoxides through the use of the special accelerators. In addition, by the practice of the invention, curing periods are varied by changing the amount of accelerator employed in conjunction with the anhydride and epoxide resin.

Thus, according to an embodiment of this invention, a new process is provided for the curing of polyepoxides to form cross-linked products using anhydride curing agents and accelerators, or activators, for these curing agents not heretofore suggested for this use. It has been found that quaternary ammonium salts of strong acids are capable of accelerating the reaction between polyepoxides and organic polybasic acid anhydrides. At a given temperature and with a particular polybasic acid anhydride curing agent more rapid curing times are produced by using the quaternary ammonium salts, and still faster curing times are produced by increasing the amount of activator. Through the use of less activator, slower curing times are obtainable. Hence, rather than using a different anhydride for each given temperature, a single anhydride is used and the curing time is increased or decreased as desired depending upon the amount of accelerator employed. These quaternary ammonium salts have an additional advantage of being neutral and in admixture with polyepoxides they are stable until heated.

This invention thus provides a process for curing polyepoxides which includes mixing and reacting the polyepoxide with an organic polybasic acid anhydride as the curing agent and an activator for the curing agent comprising a neutral salt, i.e., a quaternary ammonium salt of a strong acid, preferably a quaternary ammonium halide. It has been found that when the anhydride curing agent is used in combination with these activators they display surprisingly increased activity as curing agents for polyepoxides. As will be readily apparent, there is a remarkable increase in curing rate when these initiators are used.

Polyepoxides with which this invention is concerned are now well-known and need not be discussed at length herein. The most useful of these epoxide resins is made from the reaction of a polyhydric phenol with epihalohydrin or glycerol dihalohydrin, and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of the halohydrin (epichlorhydrin or glycerol dichlorhydrin) to dihydric phenol being at least about 1.2 to one up to around five to one.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane, and the like. Another group of polyepoxides is produced by the reaction of a polyhydric alcohol with epichlorhydrin or glycerol dichlorhydrin as disclosed in Zech Patent 2,581,464. Any of the various polyepoxides made from phenols, or alcohols, and epichlorhydrin as described can be used in accordance with this invention. It is preferred, however, to employ a polyepoxide having a weight per epoxide below one thousand.

Another type of polyepoxide which can advantageously be used in making the new compositions is the epoxidized esters of unsaturated fatty acids, as described, for example, in U.S. Patent 2,485,160.

Any of the known anhydride curing agents are employed in the curing of polyepoxides in accordance with the practice of this invention. Dibasic acid anhydrides such as phthalic acid anhydride are very suitable. Dicarboxylic acid anhydrides applicable to this invention include both aliphatic and aromatic dicarboxylic acid anhydrides, either saturated or unsaturated, for example, succinic, adipic, maleic, glutaric, phthalic and sebacic anhydrides, naphthalene dicarboxylic acid anhydrides, etc. Endo-cis-bicyclo-(2,2,1)-5-heptene-2,3-dicarboxylic anhydride (sold under the trademark "Nadic" anhydride) and 1,4,5,6,7,7-hexachlorobicyclo-(2,2,1)-5-heptene-2,3-dicarboxylic anhydride (sold under the trademark "Chlorendic" anhydride) are also desirable.

Neutral quaternary ammonium salts within the contemplation of this invention are tetraalkyl, aryl trialkyl and alkaryl trialkyl ammonium salts of strong acids wherein the aryl, alkaryl and alkyl substituents each have no more than eight carbon atoms. Examples of such quaternary ammonium compounds include benzyltrimethyl ammonium chloride, benzyltrimethyl ammonium phosphate, trimethyl benzyl ammonium sulphates, benzyltriethyl ammonium chloride, tributyl benzyl ammonium chloride, tripropyl benzyl ammonium chloride, tolyl trimethyl ammonium chloride, octyl trimethyl ammonium bromide, ethylene bis(trimethyl ammonium bromide), ethyl pyridine chloride, etc., preferred salts being quaternary ammonium halides. Also intended are ion exchange resins containing quaternary ammonium salts of strong acids.

In carrying out the process of this invention, the polyepoxide is cured by mixing the anhydride curing agent and the activator with the polyepoxide. The amount of anhydride curing agent to be used in the process will vary over a wide range depending upon its structure. In general good cures are obtained by reacting the anhydride with polyepoxide in a ratio of 0.5 to one anhydride equivalent per epoxide equivalent. By anhydride equivalent is meant the weight of the anhydride per anhydride group. The quaternary ammonium salts, on the other hand, are employed only in very small amounts. Excellent results are obtained when the activator is utilized in amounts varying from 0.01 percent to ten percent by weight of the polyepoxide-anhydride mixture, and more preferably in amounts varying from 0.1 percent to two percent by weight of the resin-anhydride mixture. Since quaternary ammonium salts are hygroscopic it is sometimes more convenient to employ the salt as an aqueous solution.

In effecting the cure, the temperature range will vary somewhat with the particular anhydride and also with the amount of activator used. Excellent rates of cure are obtained at temperatures ranging from about 100° C. to 200° C. and these are the preferred temperatures to be used. Temperatures much above 200° C. are generally not desirable, but may be employed if necessary.

In order to illustrate more clearly the use of accelerators in the process for making cured epoxide compositions according to this invention, reference is made to the following examples. The examples are illustrative only since modifications obviously will occur to those skilled in the art.

*Example 1*

In a reaction vessel equipped with an agitator, thermometer and condenser about one mol of bisphenol is dissolved in ten mols of epichlorhydrin and one to two percent water is added to the resulting mixture. The mixture is then brought to 80° C. and two mols of sodium hydroxide are added in small portions over a period of about one hour. During the addition, the temperature of the mixture is held at about 90° C. to 110° C. After the sodium hydroxide has been added, the water formed in the reaction and most of the epichlorhydrin is distilled off. The residue is combined with an approximately equal amount of benzene and the mixture is filtered to remove the salt. The benzene is then removed to yield a viscous liquid having a weight per epoxide of 185.

*Example 2*

In a reaction vessel equipped with agitator, thermometer and condenser, about 276 parts (three mols) of glycerol are mixed with 832 parts (nine mols) of epichlorhydrin. To this reaction mixture are added ten parts of diethyl ether solution containing about 4.5 percent boron trifluoride, according to U.S. Patent 2,581,464. The temperature of this mixture is held between 50° C. and 75° C. for about three hours. About 370 parts of the resulting glycerol-epichlorhydrin condensate are dissolved in nine hundred parts of dioxane containing about three hundred parts of sodium aluminate. While agitating, the reaction mixture is heated and refluxed at 93° C. for nine hours. After cooling to atmospheric temperature, the insoluble material is filtered from the reaction mixture and low boiling substances removed by distillation to a temperature of about 150° C. at 20 mm. pressure. The resulting polyglycidyl ether is a pale yellow viscous liquid containing between two and three epoxide groups per molecule. It has a weight per epoxide of 155.

*Example 3*

In a reaction vessel equipped with an agitator, thermometer and condenser, a solution consisting of 11.7 parts of water 1.22 parts of sodium hydroxide and 13.38 parts of bisphenol is prepared by heating the mixture of ingredients to 70° C. and then cooling to 46° C. at which temperature 14.06 parts of epichlorhydrin are added while agitating the mixture. After twenty-five minutes have elapsed, there are added during an additional fifteen minutes time a solution consisting of 5.62 parts of sodium hydroxide in 11.7 parts of water. This causes the temperature to rise to 63° C. Washing with water at 20° C. to 30° C. temperature is started thirty minutes later and continued for 4½ hours. The product is dried by heating to a final temperature of 140° C. in eighty minutes and cooling rapidly. At room temperature, the product is an extremely viscous semi-solid having a melting point of 26° C. by Durrans' Mercury Method and a weight per epoxide of 240.

*Example 4*

In a suitable container, ten parts by weight of the polyepoxide of Example 1 and 3.9 parts by weight of phthalic anhydride are mixed and slowly heated until a clear melt is obtained (below 110° C.), whereupon 0.50 part by weight of a sixty percent aqueous solution of benzyltrimethyl ammonium chloride are rapidly stirred into the melt. The resulting mixture is poured into an aluminum cup and is heated at 110° C. Gelation of the composition occurs in two minutes.

Other blends of varied proportions of the polyepoxide of Example 1 with phthalic anhydride, treated in the same manner as outlined in Example 4, are illustrated in the following table:

| Polyepoxide, Parts By Wt. | Phthalic anhydride, Parts By Wt. | BTMACL,[1] Parts By Wt. | Gel Time (Minutes) at 110° C. |
|---|---|---|---|
| 10.0 | 3.9 | 0.006 | 285. |
| 10.0 | 3.9 | 0.01 | 160. |
| 10.0 | 3.9 | 0.015 | 25. |
| 10.0 | 3.9 | 0.0 | No gel in 360 min. |
| 10.0 | 3.9 | 0.03 | 12. |
| 10.0 | 3.9 | 0.10 | 6. |
| 10.0 | 3.9 | 0.17 | 4. |
| 10.0 | 7.8 | 0.17 | 4. |
| 10.0 | 7.8 | 0.50 | 1. |

[1] BTMACL represents benzyltrimethyl ammonium chloride (a sixty percent aqueous solution).

*Example 5*

Several aliquot portions of the polyepoxide of Example 1 with phthalic anhydride are treated as in the procedure of Example 4. Results with anhydrous catalyst, without catalyst and with water are set forth in the following table:

| Polyepoxide of Example 1, Parts By Weight | Phthalic Anhydride, Parts By Weight | BTMACL,[1] Parts By Weight | Water, Parts By Weight | Gel Time (Min.) at 110° C. |
|---|---|---|---|---|
| 10.0 | 3.9 | --------- | 0.07 | No gel in 360 min. |
| 10.0 | 3.9 | --------- | 0.20 | Do. |
| 10.0 | 7.8 | --------- | 0.07 | Do. |
| 10.0 | 7.8 | --------- | 0.20 | Do. |
| 10.0 | 3.9 | 0.10 | ------ | 6. |
| 10.0 | 7.8 | --------- | ------ | No gel in 360 min. |

[1] BTMACL represents benzyltrimethyl ammonium chloride (anhydrous).

*Example 6*

(A) In a suitable container, 15.5 parts by weight of the polyepoxide prepared in Example 2, and 14.8 parts by weight of phthalic anhydride are combined and heated until a clear melt is obtained, whereupon 0.20 part by weight of a sixty percent aqueous solution of benzyltrimethyl ammonium chloride are rapidly stirred into the melt. The resulting mixture is poured into an aluminum cup and is heated at 110° C., initial gelation occurring after twenty-five minutes.

(B) The following table illustrates the gelation rate of polyepoxide-phthalic anhydride blends, both with and without the use of benzyltrimethyl ammonium chloride as a catalyst. The epoxidized soya oil employed in this example has an equivalent weight per epoxide of 260 (Rohm & Haas Paraplex G-62).

| Polyepoxide | Polyepoxide, Parts By Wt. | Phthalic Anhydride, Parts By Wt. | BTMACL,[1] Parts By Wt. | Gel Time (Minutes), at 110° C. |
|---|---|---|---|---|
| Example 2 | 15.5 | 14.8 | 0.0 | 39 |
| Do | 15.5 | 14.8 | 0.20 | [2] 25 |
| Do | 15.5 | 7.4 | 0.0 | 25 |
| Do | 15.5 | 7.4 | 0.20 | 7 |
| Epoxidized Soya Oil | 26.0 | 14.8 | 0.0 | 340 |
| Do | 26.0 | 14.8 | 0.30 | 170 |

[1] BTMACL represents benzyltrimethyl ammonium chloride (sixty percent aqueous solution).
[2] A tabulation of Example 6A.

*Example 7*

In accordance with the procedure of part A of Example 6, twenty-five parts by weight of the polyepoxide of Example 3, 9.8 parts by weight of maleic anhydride and 0.30 part by weight of a sixty percent aqueous solution of benzyl trimethyl ammonium chloride are combined and heated at 110° C. Initial gelation occurs after twenty-seven minutes, while 290 minutes are required for the initial gelation of a blend of twenty-five parts by weight of the polyepoxide of Example 3 with 9.8 parts by weight of maleic anhydride, treated in the same manner, without employing the catalyst.

*Example 8*

According to the procedure of Example 4, ten parts by weight of the polyepoxide of Example 1 and 3.9 parts by weight of phthalic anhydride are combined with 0.10 part by weight of anhydrous benzyltrimethyl ammonium sulphate and heated to 110° C. Initial gelation of the mixture occurs after fifty-five minutes.

What is claimed is:

1. In the process for resinifying and curing a glycidyl polyether of a polyhydric compound of the group consisting of polyhydric alcohols and phenols having at least two hydroxyl groups, said glycidyl polyether having an epoxy equivalency greater than one, wherein the glycidyl polyether and a polycarboxylic acid anhydride are mixed and heat reacted in a ratio of 0.5 to 1 anhydride equivalent per epoxide equivalent, the improvement which comprises heat reacting the glycidyl polyether and the polycarboxylic acid anhydride and admixing as an accelerator for the reaction from 0.01 percent to 10 percent of an activator, based on the polyether-anhydride mixture, consisting of a quaternary ammonium salt selected from the group consisting of tetraalkyl, aryl trialkyl, and alkaryl trialkyl ammonium salts of strong acids wherein the aryl, alkaryl and alkyl substituents have no more than eight carbon atoms, considering an epoxide equivalent as the weight in grams of glycidyl polyether per epoxide group, and an anhydride equivalent as the weight in grams of polycarboxylic acid anhydride per anhydride group.

2. The process of claim 1 wherein the polycarboxylic acid anhydride is a dicarboxylic acid anhydride and the quaternary ammonium salt is a quaternary ammonium halide.

3. The process as defined in claim 1 wherein the glycidyl polyether is a diglycidyl ether of a polyhydric phenol.

4. The process as defined in claim 2 wherein the quaternary ammonium salt is benzyltrimethyl ammonium chloride.

5. A heat curable composition of matter comprising a glycidyl polyether of a polyhydric compound of the group consisting of polyhydric phenols and polyhydric alcohols, from 0.5 to 1 anhydride equivalent of a dicarboxylic acid anhydride per epoxide equivalent and from 0.01 percent to 10 percent by weight of the polyether-anhydride mixture of a quaternary ammonium salt selected from the group consisting of tetraalkyl, aryl trialkyl, and alkaryl trialkyl ammonium salts of strong acids wherein the aryl, alkaryl and alkyl substituents have no more than eight carbon atoms, considering an epoxide equivalent as the weight in grams of glycidyl polyether per epoxide group, and an anhydride equivalent as the weight in grams of polycarboxylic acid anhydride per anhydride group.

References Cited in the file of this patent
UNITED STATES PATENTS

| | | |
|---|---|---|
| 2,531,440 | Jordan | Nov. 28, 1950 |
| 2,752,269 | Condo et al. | June 26, 1956 |
| 2,768,992 | Zukas | Oct. 30, 1956 |